(12) United States Patent
Ouvrier-Buffet et al.

(10) Patent No.: US 8,895,930 B2
(45) Date of Patent: Nov. 25, 2014

(54) BOLOMETRIC DETECTOR OF AN ELECTROMAGNETIC RADIATION IN THE TERAHERTZ RANGE AND DETECTOR ARRAY DEVICE COMPRISING SAID DETECTORS

(71) Applicant: Commissariat a l'Energie Atomique et aux Energies Alternatives, Paris (FR)

(72) Inventors: Jean-Louis Ouvrier-Buffet, Sevrier (FR); Jerome Meilhan, Grenoble (FR); Duy Thong N'Guyen, Fontaine (FR); Francois Simoens, Claix (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 120 days.

(21) Appl. No.: 13/687,583

(22) Filed: Nov. 28, 2012

(65) Prior Publication Data
US 2013/0146773 A1    Jun. 13, 2013

(30) Foreign Application Priority Data

Dec. 9, 2011    (FR) ..................... 11 61426

(51) Int. Cl.
*G01J 5/02* (2006.01)
*G01J 5/08* (2006.01)
*G01J 5/20* (2006.01)

(52) U.S. Cl.
CPC ............ *G01J 5/20* (2013.01); *G01J 5/0853* (2013.01); *G01J 5/0837* (2013.01); *G01J 5/0803* (2013.01); *G01J 5/0225* (2013.01)
USPC ..................................... 250/349

(58) Field of Classification Search
CPC ..... G01J 5/0225; G01J 5/0208; G01J 5/0837; G01J 5/0853; G01J 5/20
USPC ............ 250/349, 338.1–338.5, 340, 250/341.1–341.8
See application file for complete search history.

(56) References Cited

U.S. PATENT DOCUMENTS

| 6,329,655 | B1 | 12/2001 | Jack et al. | |
| 7,397,428 | B2 * | 7/2008 | Cole et al. | 343/700 MS |
| 2006/0151722 | A1 * | 7/2006 | Cole et al. | 250/493.1 |
| 2006/0231761 | A1 | 10/2006 | Peytavit et al. | |
| 2010/0276597 | A1 * | 11/2010 | Ouvrier-Buffet | 250/349 |
| 2011/0057107 | A1 * | 3/2011 | Agnese et al. | 250/338.3 |
| 2012/0091342 | A1 * | 4/2012 | Berger et al. | 250/338.4 |

FOREIGN PATENT DOCUMENTS

EP    2246677 A1    11/2010

OTHER PUBLICATIONS

Republique Francaise, Rapport de Recherche Preliminaire dated Jul. 4, 2012, 2 pgs, French Language (FR 1161426).
Perez, Rafael, Contribution à l'analyse théorique et expérimentale de radargrammes GPR. Performances des antennes: apports d'une configuration multistatique, Oct. 10, 2005, Thèse No. 34-2005, French Language (164 pgs).

* cited by examiner

*Primary Examiner* — Kiho Kim
(74) *Attorney, Agent, or Firm* — Harris Beach PLLC

(57) ABSTRACT

A bolometric detector of a terahertz radiation, including an assembly reflective for said electromagnetic radiation; at least one bolometric microbridge suspended above the reflective assembly and including a first bowtie antenna, a resistive load coupled with said antenna, and a thermometric element coupled with the resistive load. The reflective assembly includes a reflective layer; an insulating layer on the reflective layer; a periodic array of metallic patterns on the insulating layer, the thickness and the dielectric permittivity of the insulating layer, and the pitch and the filling factor of the array being selected to obtain a constructive interference at the level of said microbridge.

12 Claims, 8 Drawing Sheets

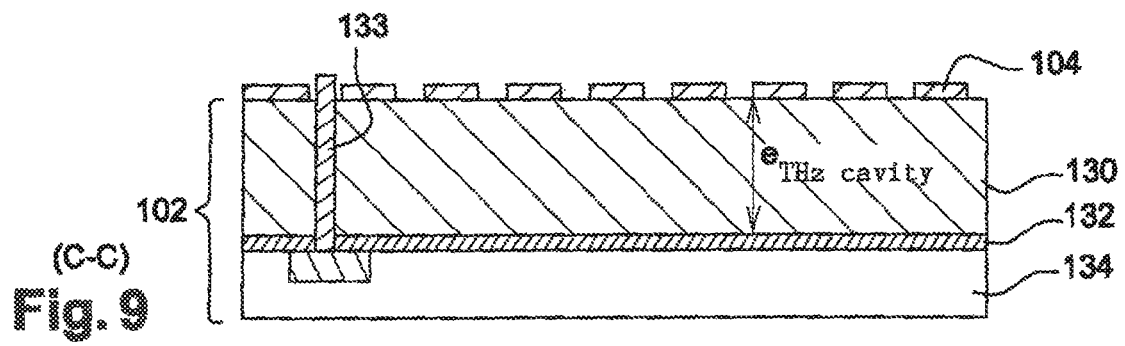
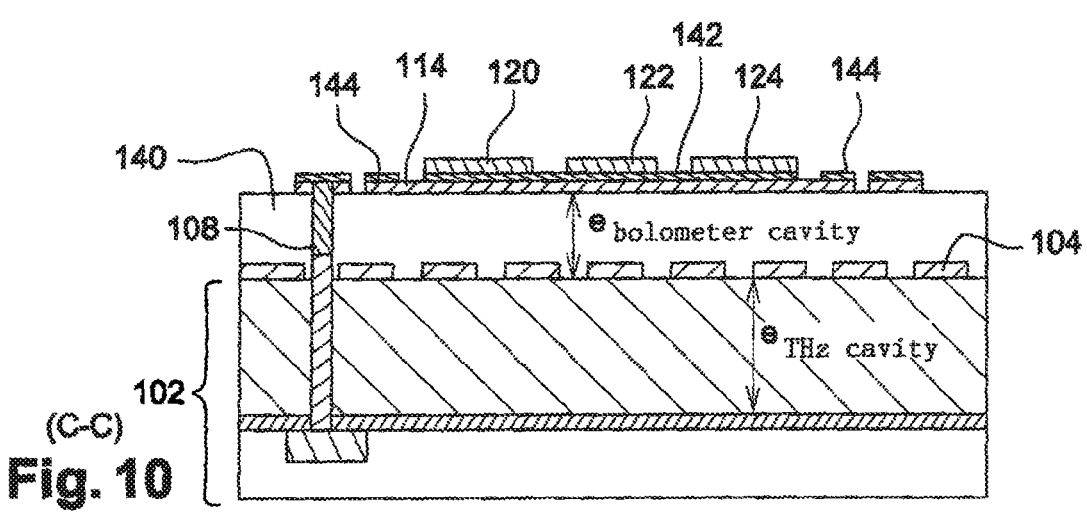
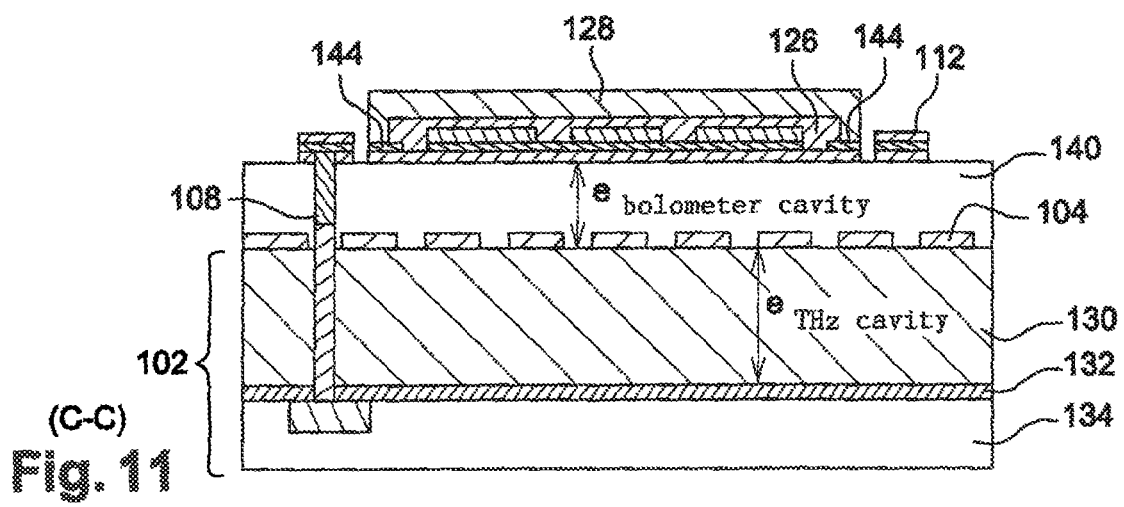

BOLOMETRIC DETECTOR OF AN ELECTROMAGNETIC RADIATION IN THE TERAHERTZ RANGE AND DETECTOR ARRAY DEVICE COMPRISING SAID DETECTORS

CROSS-REFERENCE TO RELATED APPLICATIONS

This application claims the benefit of French Patent Application No. 1161426, filed on Dec. 9, 2011. The entirety of this application is incorporated herein by reference.

DOMAIN OF THE INVENTION

The present disclosure relates to bolometric detectors with an antenna, and more specifically to detectors with crossed bowtie antennas, intended for the detection of an electromagnetic radiation in the terahertz range.

The detection in the terahertz range, that is, in the frequency range between 100 gigahertz and 10 terahertz, has many applications.

It is thus possible to mention, without this being a limitation:

medical diagnosis, for which the detection in the terahertz range provides access to anatomical structure details and to the chemical reactions occurring at their level, which can be provided neither by X rays, nor by ultrasounds;

the military field and flight safety, with for example the forming of anti-stealth radars or of high-resolution radars making a discrimination possible;

the study and the detection of atmospheric contamination, the observation in submillimetric waves indeed providing significant information as to atmospheric chemistry and thus allowing an unequaled follow-up of atmospheric contaminants, such as for example, nitrogen trioxide, which is difficult to detect with conventional techniques due to its strong absorption lines in far infrared;

the identification of chemical species, many complex chemical compounds having a signature in the terahertz range which is sufficiently unequivocal to enable to detect them with certainty, such as for example certain explosives and toxic products, certain compounds resulting from the ripening of fruits or again certain compounds originating from industrial combustion;

the analysis of molecular or atomic phenomena, terahertz spectroscopy enabling to obtain new information as to mechanisms such as photoexcitation, photodissociation, and solvation. The same is true for the analysis of molecular interactions (vibratory states of the molecules or of the hydrogen bonds, for example), condensed phase systems, dynamic processes in large molecules, such as peptides and proteins, or the observation of the orientation of polymers with a technique based on terahertz radiation;

the study of the properties of materials, such as semiconductors, to non-destructively determine, for example, their mobility, the dynamics of ultra-fast carriers and carrier-phonon interactions, supraconductors, polymers, ceramics, organic materials, and porous materials. Further, materials such as plastics, paper, and textiles are transparent in the terahertz range and, conversely, metals are perfect reflectors and water has a high absorbing power. Thus, the detection in this range is particularly well adapted to the inspection of packaged products or to the real time in situ control of manufacturing processes, for example; and wide-band telecommunication, the race for higher and higher data flow rates, at a terrestrial level as well as between satellites, urging manufacturers to develop systems operating at frequencies which now reach several hundreds of gigahertz, or even, in a close future, several terahertz.

BACKGROUND

Usually, a resistive bolometric detector measures the power of an incident radiation in the infrared range. For this purpose, it comprises an absorbing resistive bolometric element, which converts the light flow into a heat flow, which generates a temperature rise of said element with respect to a reference temperature. This temperature increase then induces a variation of the electric resistance of the absorbing element, thus causing voltage or current variations thereacross. Such electric variations form the signal delivered by the sensor.

However, the temperature of the absorbing element is usually highly dependent on its environment, and especially on the temperature of the substrate which comprises the electronic read circuit. To desensitize as much as possible the absorbing element from its environment, and thus increase the detector sensitivity, the absorbing element is generally thermally insulated from the substrate.

FIG. 1 is a simplified perspective view of an elementary resistive bolometric detector 10 of the state of the art illustrating this thermal insulation principle. Such an elementary detector, appearing in the described example in the form of a suspended membrane, conventionally belongs to a one- or two-dimensional array of elementary detectors.

Detector 10 comprises a thin membrane 12 absorbing the incident radiation, suspended above a substrate-support 14 via two conductive anchoring nails 16, having said membrane attached thereto by two thermal insulation arms 18. Membrane 12 usually comprises a layer of electric insulator, such as for example $SiO_2$, SiO, SiN, ZnS or the like, which ensures the mechanical stiffness of membrane 12, as well as an electric metal interconnection layer deposited on the insulator layer.

A thin layer 20 of resistive thermometric material is further deposited at the center of membrane 12 on the metal interconnection layer, especially a layer made of a semiconductor material, such as strongly or weakly resistive polysilicon or amorphous p- or n-type silicon, or a vanadium oxide ($V_2O_5$, $VO_2$) formed in a semiconductor phase.

Finally, the substrate-support 14 comprises an electronic circuit integrated on a silicon wafer, usually known as a "read circuit". The read circuit comprises, on the one hand, the excitation and read elements of thermometric element 20 and, on the other hand, the multiplexing components which enable to serialize the signals originating from the different thermometric elements present in the array detector.

In operation, membrane 12 heats up under the effect of an incident electromagnetic radiation and the generated thermal power is transmitted to thermometric material layer 20. Periodically, the read circuit arranged in substrate 14 polarizes membrane 12 by submitting nails 16 to a polarization voltage, and collects the current flowing through thermometric element 20 to deduce therefrom a variation of its resistance, and thus the incident radiation having caused said variation.

For brevity, since the arrangement and the operation of such a detector are conventional, it will not be explained in further detail. It should however be noted that membrane 12 fulfils, in addition to the thermal insulation function, three main functions: an antenna function to receive the radiation, a function of conversion of the received electromagnetic power into thermal power, and a function of thermometric measurement of the generated thermal power. Since it is used as an antenna, membrane 12 has dimensions which are accordingly selected to be of the same order of magnitude as the wavelength of the radiation intended to be measured.

Now, in the terahertz range, wavelengths may reach one millimeter, which thus requires a membrane of the same order of magnitude. However, for such dimensions, the thermal mass, the mechanical hold, and the radiation loss of the membrane are such a problem that, in the end, they adversely affect the detector efficiency.

This is why, for such a frequency range, the radiation receive function is decoupled from the other functions. The receive function is thus ensured by a planar antenna, and the function of conversion of the electromagnetic power into thermal power is ensured by the resistive load of the antenna. The load dimensions conventionally fulfill the impedance matching conditions, which depend on the geometry of the antenna and on the nature of the layers supporting it, to obtain an optimal conversion. The resistive load is further in thermal contact with a thermometric element for the measurement of the generated thermal power. The assembly then forms a bolometer with an antenna.

Document US-A-2006/0231761 describes a "direct resistive coupling" bolometer with an antenna 30 operating in the millimetric range, for example, in the range from 1 to 10 THz, and provided with a bowtie antenna 32, simplified perspective and cross-section views thereof being respectively illustrated in FIGS. 2 and 3. The bolometer is made in the form of a membrane 34 suspended above a substrate-support 36 via two conductive anchoring nails or "holding arms" 38, to which it is attached by two thermal insulation arms 40. Membrane 34 comprises bowtie antenna 32, a resistive load 42 in the same plane as bowtie antenna 32 and in contact therewith, as well as a thermometric element 44 formed on and/or under resistive load 42 and in contact therewith. Resistive load 42 has a sheet resistance optimized to obtain a maximum resistive coupling with the antenna, especially a sheet resistance ranging between 100Ω and 200Ω. An explanation of the bowtie antenna can for example be found in R. PEREZ's thesis, which can be consulted on the following site: http://www.unilim.fr/theses/2005/sciences/2005limo0053/perez_r.pdf.

A simple antenna cannot absorb all the incident power and part of the incident power is transmitted to the rear of the antenna. More specifically, part of the absorbed incident power is reemitted to the rear of the antenna. To enhance the general absorption, a reflective assembly 46 is provided in substrate-support 36 above read circuit 48 comprising on the one hand the excitation and read elements of thermometric element 44, and on the other hand the multiplexing components which enable to serialize the signals originating from the different thermometric elements present in the array detector.

Reflective assembly 46 comprises a reflective layer 50 on which is deposited a dielectric material layer 52 satisfying the following relation:

$$e = \lambda/(4n) \quad (1)$$

where λ is a wavelength for which, and around which a resonance phenomenon is desired, e is the thickness of layer 52, and n=√∈, with ∈ standing for the dielectric permittivity of the material forming layer 52. A quarter-wave cavity is thus obtained.

In such a configuration, the thermometric element is independent from the antenna, and its size then no longer depends on the incident wavelength but on factors determining the intrinsic performance of the detector (sensitivity, signal-to-noise ratio, etc. . . . ), in accordance with the requirements of the targeted application, for example, active imaging or passive imaging.

Further, in most cases, the incident electromagnetic radiation is not polarized, whereby its reception by a single antenna does not enable to capture the entire electromagnetic power. However, a non-polarized radiation may be considered as resulting from the superposition of two components linearly polarized in two orthogonal directions, each of these components transporting half the power of the wave. As known per se, an efficient way to capture an incident electromagnetic radiation is to use two crossed bowtie antennas.

However, the use of two crossed bowtie antennas suspended on a membrane induces a substantial decrease of the thermal resistance of the membrane since one of the bowtie antennas inevitably crosses the thermal insulation arms.

Referring to the simplified top and cross-section views of FIGS. 4 and 5, document U.S. Pat. No. 6,329,655 describes a bolometer 60 with an antenna, operating in the millimetric range and provided with two crossed bowtie antennas 62, 64, which overcomes this problem.

The principle of bolometer 60 is based on the capacitive coupling achieved between antennas 62, 64, arranged on a substrate-support 66, and a resistive load 68, arranged in a suspended membrane 70 and having a thermometric element 72 placed thereon.

Resistive load 68, which takes the form of a square layer arranged vertically above the center of antennas 62, 64, has a surface opposite thereto and thus forms a capacitance with antennas 62, 64. The radiation captured by antennas 62, 64 is thus transmitted to load 68 by capacitive coupling.

The resistance of load 68 and the value of the capacitance that it forms with antennas 62, 64 are selected to establish a high capacitive coupling, advantageously to fulfill at best the following relation, which achieves an optimal impedance matching between antennas 62, 64 and resistive load 68, and thus the optimal capacitive coupling:

$$\sqrt{\left(\frac{1}{\pi \cdot f \cdot C}\right)^2 + (R \cdot C)^2} \approx 100 \; \Omega$$

where f is the radiation frequency, C is the value of the capacitance formed between antennas 62, 64 and resistive load 68, and R is the value of the resistance of resistive load 68. The characteristics of the capacitive coupling thus especially set, via the value of capacitance C, height $e_{bolometer\_cavity}$ of the cavity separating membrane 70 from substrate-support 66.

Finally, for the previously-discussed reasons, to enhance the general absorption of the radiation, a reflective assembly 72 is provided in substrate-support 66 above read circuit 74, comprising, on the one hand, the excitation and read elements of thermometric element 68, and on the other hand the multiplexing components which enable to serialize the signals originating from the different thermometric elements present in the array detector.

Reflective assembly 72 comprises a reflective layer 76 having a quarter-wave cavity formed by a dielectric material layer 78 deposited thereon, fulfilling previously-described relation e=λ/(4n). Together, reflective assembly 72 and antennas 62, 64 form a resonant cavity.

The principle of a resonant cavity for the thermometric detection is described in relation with FIG. 6. As known per se, a resonant cavity is formed by establishing a constructive interference between a monochromatic radiation I, of wavelength λ, incident on an absorbing element, especially antennas, and radiation R reflected by the reflective assembly formed of a metallic reflective layer 82, having material layer 80 deposited thereon, dielectric permittivity ∈ and thickness e of layer 80 being selected according to relation (1) to adjust the resonance to the desired wavelength. The absorbing element is formed on layer 80, as illustrated by element 90 and/or suspended thereabove, as illustrated by element 92.

Thereby, the phase shift between incident radiation I and reflected radiation R is zero at distance e from reflective layer 82, so that a constructive interference is obtained at this distance, which provides an optimal absorption of the power of the incident electromagnetic field. As previously mentioned, layer 80 is currently called a "quarter wave cavity" due to relation e=λ/(4n).

An optimal arrangement of a suspended bolometric membrane and of a quarter-wave cavity is achieved when layer 80 preferentially is a layer of vacuum, or even of a gas of low thermal conductivity, and the bolometric membrane is placed at distance e from reflective layer 82, which is then deposited on a substrate 84 comprising the read circuit of the membrane. In such a case, the membrane is both insulated from substrate 84 and placed at the location where the electromagnetic field power absorption is maximum.

This type of layout is for example currently used for infrared thermometric detection, for which thickness e ranges between 2 micrometers and 5 micrometers, which distance allows a mass production of suspended membranes having a high-quality mechanical hold. Indeed, as known per se, to form a membrane suspended above a support, a sacrificial layer is first deposited on the reflective layer, after which the membrane is constructed on the sacrificial layer. Once the membrane has been formed, the sacrificial layer is removed so that the membrane is suspended, generally in vacuum, above the support. By providing the support with a reflective layer and by selecting a sacrificial layer having the desired thickness e, a quarter-wave cavity is thus obtained with the membrane placed at thickness e from the reflective layer.

This layout is however difficult to achieve for a terahertz detection. Indeed, for such a wavelength range, thickness e is greater than 10 micrometers, or even greater than 30 micrometers. First, support pads having such a height do not provide a high-quality mechanical hold of the suspended membrane. Second, problems of separation of the sacrificial layer can be observed for such thicknesses due to the residual stress generated during the deposition that it undergoes on manufacturing of the membrane, which stress increases as the sacrificial layer thickness increases.

This is why a state-of-the-art reflective assembly 46, 72, such as for example illustrated in FIGS. 3 and 5, is made of a solid material 52, 78, and bolometric membrane 34, 70 is suspended above reflective assembly 46, 72 by a few micrometers for its thermal insulation, by means of thermal insulation arms having an appropriate thickness, width, and length. This space above the reflective assembly is created by the deposition of a sacrificial layer having a thickness which must remain compatible with its mechanical stability during the microbolometer manufacturing method and further be compatible with the forming of contacts between the suspended bolometric membrane and the substrate comprising reflective assembly 46, 72.

This enables to have support pads of reasonable height and avoids sacrificial layer separation problems. The membrane suspension height is then no longer imposed by the thickness of the reflective assembly and can thus be much smaller. It can thus be noted that bolometric membrane 34, 70 is no longer optimally placed with respect to reflective assembly 46, 72, but at a distance of a few micrometers thereabove, taking advantage of the fact that there still is a phenomenon of optimization of the electromagnetic field power at this distance, as illustrated in the diagram of the left-hand portion of FIG. 6. This drawing illustrates the intensity of the electromagnetic field, which decreases as the distance from reflective layer 82 increases. The state-of-the-art layout for terahertz detection thus is a compromise between the technical feasibility of a membrane suspended above a reflective assembly for which the quality factor is desired to be optimized.

Such a layout however poses a number of specific problems.

First a solid layer 52, 78 of large thickness requires contact recoveries between the read circuit and the bolometric membrane, which are difficult to form, especially causing efficiency drops. For example, for a detector intended to detect a radiation around 700 GHz, the thickness of reflective assembly 46, 72 comprising a layer of silicon oxide (one of the materials most currently used in microelectronics) is approximately 33 micrometers. Now, to manufacture at a large scale a layer of such a thickness crossed by connection vias, at least three deposition steps, each associated with the forming of a portion of the vias, have to be implemented.

Finally, layer 52, 78 is deposited on a metal layer to which it may not adhere sufficiently to avoid any risk of separation during subsequent manufacturing steps.

To decrease the thickness of layer 52, 78, a dielectric of high dielectric permittivity may be used to comply with relation (1), and thus at least partially solve these problems. However, as the dielectric permittivity increases, electromagnetic phenomena appear, which may adversely affect the operation of bowties antennas, especially causing an increase of the coupling between antennas, which alters the quality of the detection. The selection of the reflective assembly thus generally results from a compromise between several antagonistic phenomena.

SUMMARY

The present invention aims at providing a reflective assembly for a terahertz detector based on suspended bolometric membranes, which has a decreased thickness without requiring, as a counterpart, an increase of its dielectric permittivity.

For this purpose, the present invention aims at a bolometric detector of an electromagnetic radiation in a wavelength range belonging to the terahertz range, comprising:
  a support comprising an assembly reflective for said electromagnetic radiation;
  at least one bolometric microbridge suspended above the reflective assembly by support and thermal insulation pads, the microbridge comprising:
    a first bowtie antenna intended to collect said electromagnetic radiation;
    a resistive load coupled with said antenna to convert the collected electromagnetic power into thermal power; and
    a thermometric element coupled with the resistive load to heat up under the effect of the generated thermal power, According to the present invention, the reflective assembly comprises:
  a layer reflective for said electromagnetic radiation;
  an insulating material layer formed on the reflective layer; and a periodic array of metallic patterns formed on the insulating material layer, the thickness and the dielectric permittivity of the insulating material layer, and the pitch and the filling factor of the array being selected to obtain a constructive interference, at the level of said microbridge, between the incident radiation to be detected and the radiation reflected by said reflective assembly.

"Microbridge" is used to designate the suspended structure, which thus especially comprises a bolometric membrane and one or several antennas.

In other words, the inventors have observed, on bolometric detectors with antennas, that it is possible to obtain a resonance phenomenon similar to that obtained with a quarter-wave cavity by combining a reflective layer, an insulating material layer and a period array of patterns. The thickness observed for the insulating material layer is then smaller than that observed in the state of the art. More specifically, in the state of the art, the thickness and the dielectric permittivity of the insulating layer are selected to set thickness e so as to obtain a zero phase shift between the incident radiation and the reflected radiation, and thus a constructive interference. The introduction of the periodic array provides at least two additional parameters of adjustment of this distance, that is, the array period and filling factor, which enables to decrease this thickness without for all this increasing the dielectric permittivity.

Thus, the absorption efficiency of the detector provided with suspended microbridges above the reflective assembly according to the present invention is higher than the absorption efficiency of a detector provided with suspended microbridges above a support having a reflective assembly with no periodic pattern array.

A setting of the characteristics of the reflective assembly is for example obtained as follows. First, the thickness and the material of the insulating material layer are selected, advantageously to comply with manufacturing and/or mechanical strength constraints. Then, several detectors are formed by varying the pitches and the filling factor of the array. The array characteristics enabling to increase the absorption efficiency more than a reference prior art detector are the retained.

As a variation, the absorption of the electromagnetic field power is computer-simulated by using a model of the bolometric membrane and of the reflective assembly and by modifying the array characteristics. It is then currently possible to make accurate computer simulations of such systems, especially by means of the finite elements technique, such as for example implemented by softwares "ANSYS HFSS" of ANSYS Inc. and "COMSOL" of COMSOL Inc.

According to an embodiment of the present invention, the array pitch ranges between $$\frac{\lambda}{12} \text{ and } \frac{\lambda}{20},$$

where λ is the wavelength of the electromagnetic radiation to be detected, and especially an array pitch equal to $$\frac{\lambda}{16}.$$

The inventors have observed that the resonance phenomenon can be easily obtained in this range. The setting of the filling factor then enables to optimize the absorption efficiency of the detector according to the present invention.

According to an embodiment of the present invention, the thickness of the insulating material layer ranges between 8 and 15 micrometers. Such a thickness especially enables to minimize separation phenomena.

According to an embodiment, the filling factor of the periodic array ranges between 95% and 99.5%, and preferably between 97.5% and 99.5%.

According to an embodiment of the present invention, the microbridge is suspended above the support at a height ranging between 0.5 micrometer and 2.5 micrometers.

According to an embodiment, the detector comprises metal vias formed in the insulating material layer and connecting the array patterns to the reflective layer, such a structure introducing no additional manufacturing step while increasing the detector absorption efficiency, when the radiation is obliquely incident thereon. Such metal vias may be formed at the same time as the vias enabling to connect the microbridge to the read circuit.

According to an embodiment, the detector comprises a second bowtie antenna, intended to collect the electromagnetic radiation, said second antenna being crossed with the first bowtie antenna, and formed on a layer of insulating material deposited on the periodic pattern array, and capacitively coupled with the resistive load of the microbridge. Thus, the detection is not sensitive to the polarization of the radiation. Further, the antennas are separated from each other by the vacuum between the microbridge and the substrate, so that there is a decreased coupling therebetween, especially via a material.

More specifically, the resistive load comprises a metal film and the microbridge comprises fins arranged in front of the second antenna on the metal film to achieve an impedance matching between the second antenna and the metal film.

Preferably, the fins take a shape similar to that of the central portions of the first antenna. Especially, the fins are covered with an electric insulator and the bolometric element is at least partially arranged on said insulator and at least partially in contact with the metal film. In other words, the fins are designed with a dimension, a shape, and a material for achieving an optimal impedance matching with the first antenna, and this, independently from the second antenna.

According to an embodiment of the present invention, the resistive load comprises a metal layer and the second antenna is at least partially arranged on this metal film or metal layer, and for example, that usually present for the electric connection of the thermometric element with the read circuit. The resistive film here performs the conversion of the electromagnetic power received by the second antenna, and this, independently from the fins and from the first antenna.

The present invention also aims at a detection system comprising at least a first and a second detector, each according to the foregoing description, in which system:
the first detector is capable of detecting an electromagnetic radiation in a first terahertz range, and the second detector is capable of detecting an electromagnetic radiation in a second terahertz range different from the first terahertz range; and
the reflective layer of the first detector is aligned with the reflective layer of the second detector, and the insulating material layer of the first detector is aligned with the insulating material layer of the second detector.

In other words, the present invention enables to obtain reflective assemblies for different wavelengths, said assemblies being of substantially equal thickness, which simplifies the manufacturing of a multispectral detector.

The foregoing and other features and advantages of the present invention will be discussed in detail in the following non-limiting description of specific embodiments in connection with the accompanying drawings, where the same reference numerals designate the same or similar elements.

BRIEF DESCRIPTION OF THE DRAWINGS

FIGS. 9 to 11 are simplified cross-section views along plane C-C illustrating a method for manufacturing the detector of FIGS. 7 and 8;

DETAILED DESCRIPTION OF THE INVENTION

Bolometric detectors comprising reflective assemblies according to the invention will now be described. It should however be understood that the present invention of course applies to any type of bolometric detector comprising a reflective assembly.

Figure 1:
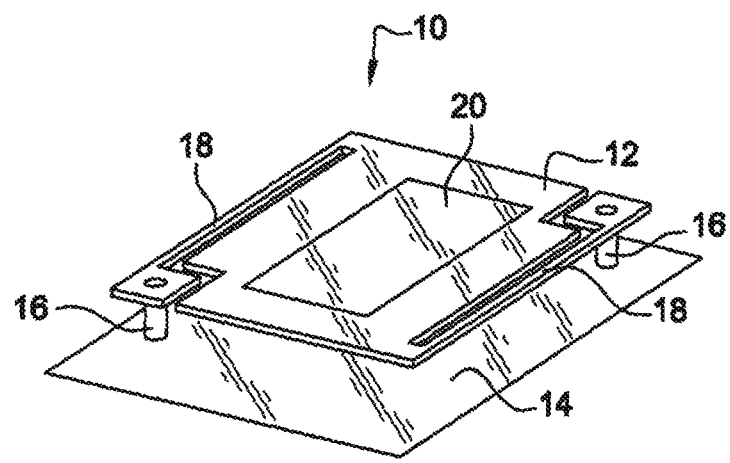
FIG. 1 is a simplified perspective view of an elementary bolometric detector of the state of the art, already described hereabove.
Figure 2:
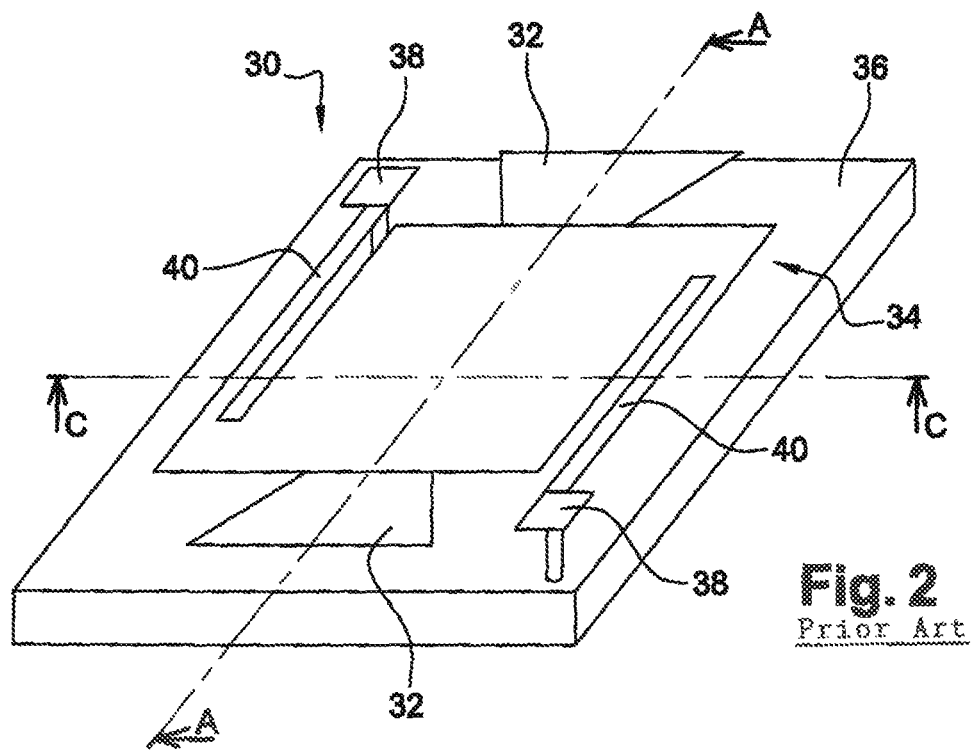
FIG. 2 is a simplified perspective view of an elementary bolometric detector with antennas of the state of the art, already described hereabove.
Figure 3:
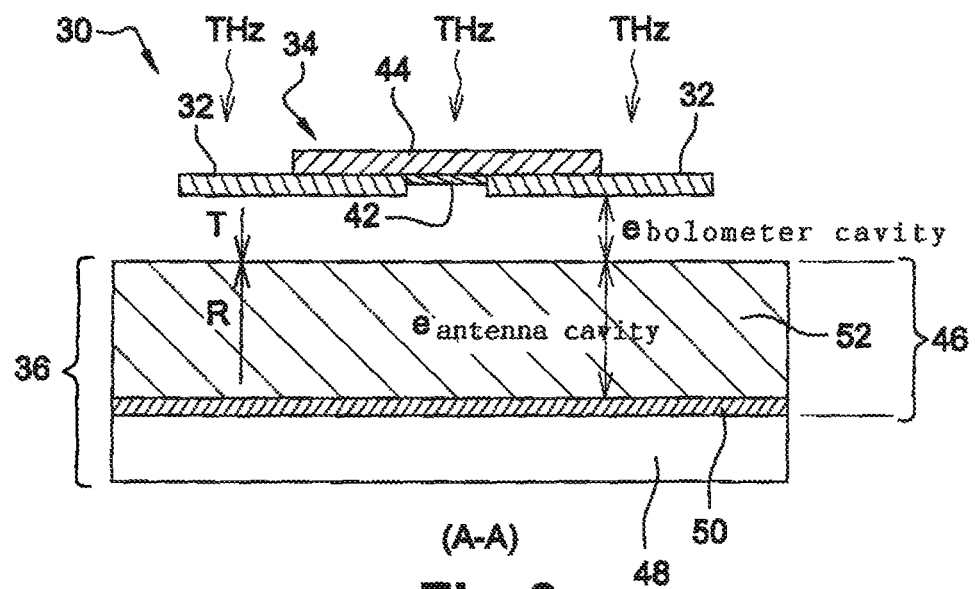
FIG. 3 is a simplified cross-section view along plane A-A of FIG. 2.
Figure 4:
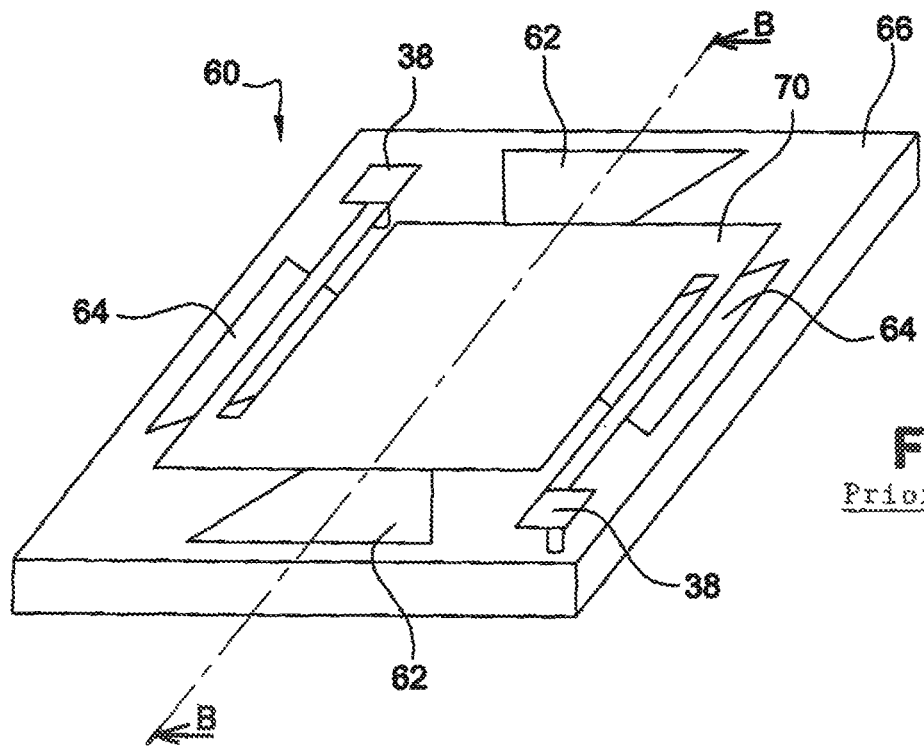
FIGS. 4 and 5 are simplified perspective views along plane B-B of a bolometric detector with antennas according to the state of the art, already described hereabove.
Figure 5:
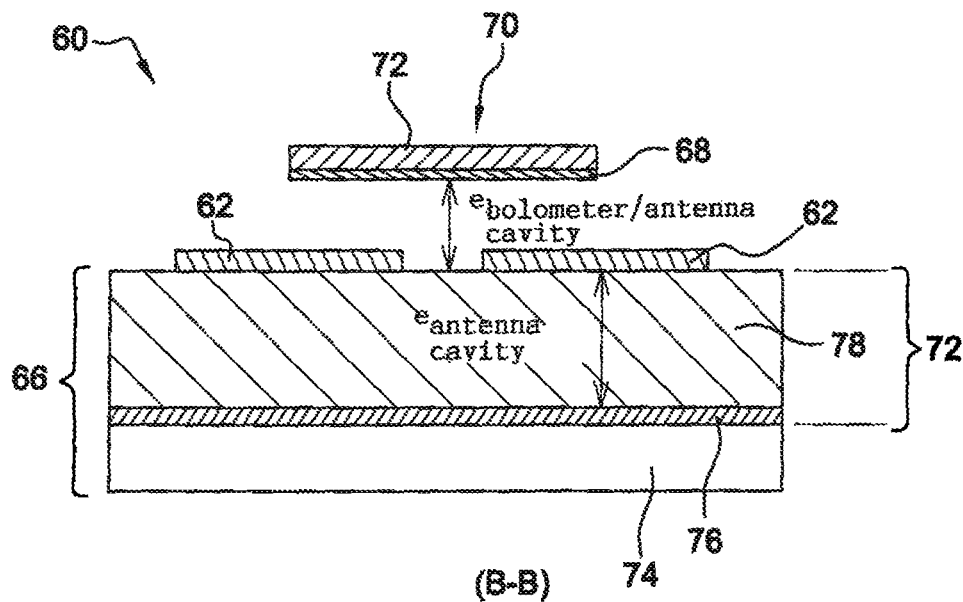
Figure 6:
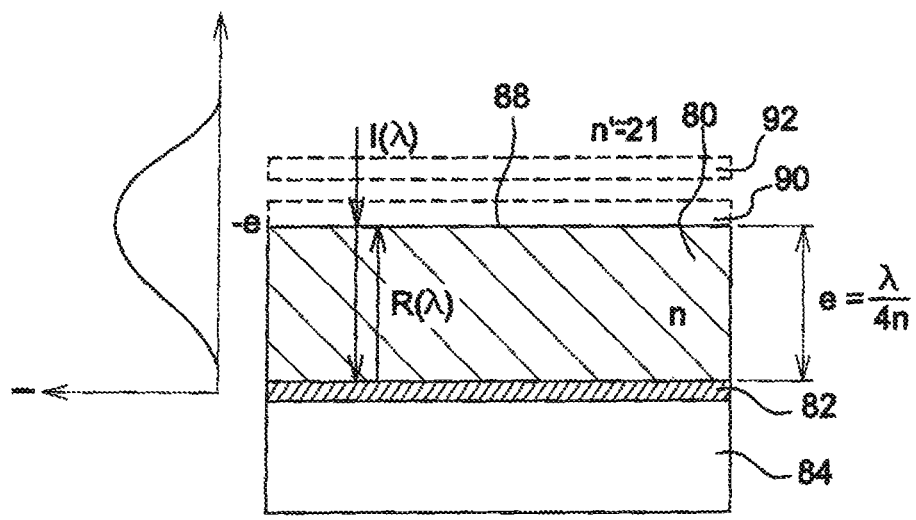
FIG. 6 is a simplified cross-section view of a quarter-wave resonant cavity of the state of the art, already described hereabove.
Figure 7:
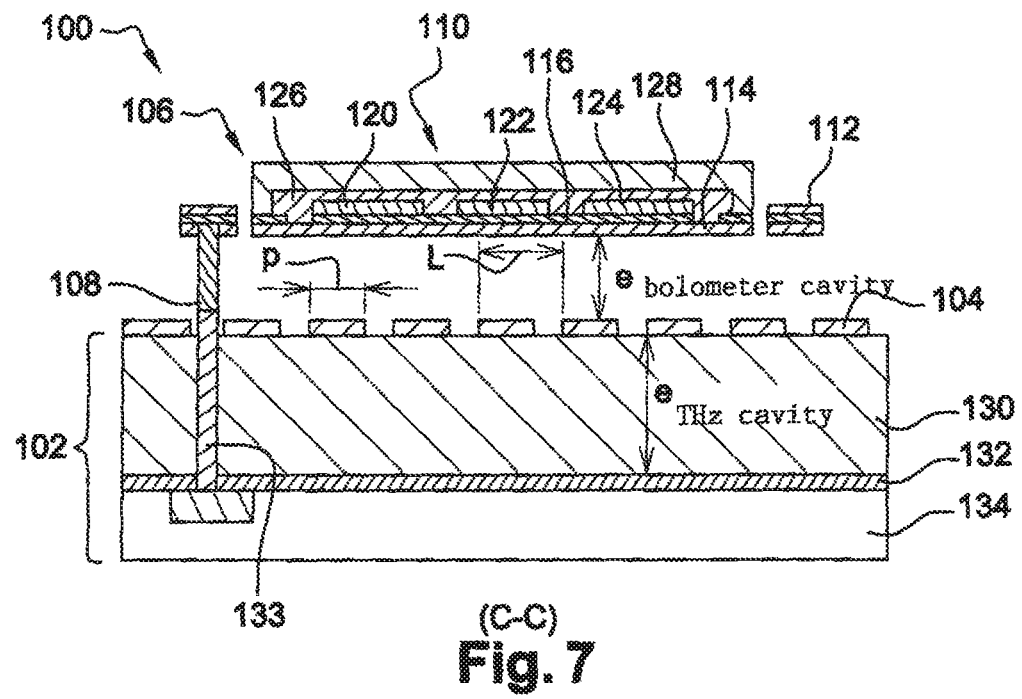
FIGS. 7 and 8 are simplified cross-section views of a detector according to the first embodiment of the present invention, in accordance with the general architecture of FIG. 2, and respectively corresponding to cross-sections along planes C-C and A-A of FIG. 2.
Figure 8:
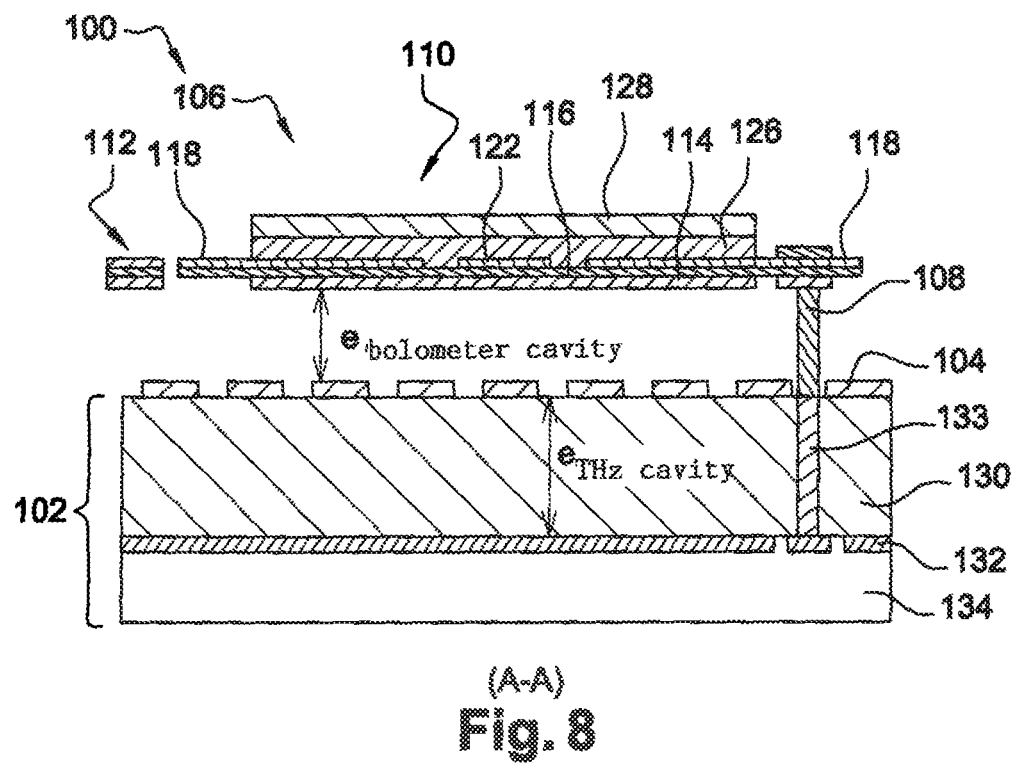

FIGS. 7 to 8 illustrate an elementary bolometric detector 100 according to the a first embodiment of present invention, forming part of an array of elementary detectors, for detection in a terahertz radiation range.

Bolometer 100 comprises a support 102, having a periodic array of metal patterns 104 deposited thereon. Bolometer 100 also comprises a microbridge 106, suspended above support 102 by at least two conductive anchoring nails 108.

Microbridge 106 is formed of a central portion 110 and of two thermal insulation arms 112 connecting central portion 110 to anchoring pads or nails 108. Microbridge 106 comprises a first electric insulator layer 114, as well as a conductive layer 116, and more specifically a metal film, deposited on insulator layer 114.

A bowtie antenna 118 made of conductive material, of main axis (A-A) parallel to thermal insulation arms 112, is further formed on conductive layer 116 of microbridge 106 and extends on either side of central portion 110. Bowtie antenna 118 thus is resistively coupled with conductive layer 116.

Fins 120, 122, 124, made of the same material as antenna 118, are also optionally provided on conductive layer 116. Fins 120, 122, 124, as well as the portion of bowtie antenna 118 arranged in central portion 110, are covered with an electric insulator layer 126 to be electrically insulated, a portion of conductive layer 116 being left free.

A thermometric material layer 128 is further deposited on electric insulator layer 126 in contact with conductive layer 116 at the level of its portion left free by insulator layer 126.

Support 102 comprises an insulating layer 130, having a low absorption coefficient in the operating wavelength range of the detector, and a reflector 132 arranged under layer 130. Layer 130, reflector 132, and array 104 form a reflective assembly for the wavelength of interest. A functional layer 134 comprising the detector read circuits is then provided under reflector 132 and is electrically connected to nails 108 by conductive vias 133 crossing layer 130.

Periodic array 104 has at least one axis of periodicity, for example, a set of parallel metal strips, and preferably at least two axes of periodicity to be insensitive to the polarization of the radiation, for example, a set of rectangular, square, circular, star-shaped pads, especially in the form of a Jerusalem cross, or of a three-rayed star, etc.

Layer 130 has a thickness ranging between 1 and 15 micrometers, preferably between 8 and 15 micrometers, and preferably on the order of 12 micrometers, which especially enables to easily construct vias 133.

Periodic array 104 has along each of its axes of periodicity a pitch ranging between $$\frac{\lambda}{12} \text{ and } \frac{\lambda}{20},$$

where $\lambda$ is a wavelength of the radiation to be detected, for example, the wavelength for which the bowtie antenna is also designed, and preferably a pitch substantially equal to $$\frac{\lambda}{16},$$

which for example corresponds to a periodic array of 8 lines by 8 column of metal pads.

The filling factor of the array according to each periodic axis, defined as being the ratio of the dimension of pattern L along said axis to sum (L+l) of dimension L and of spacing l along said axis between two adjacent patterns, is then selected to accurately set the resonance wavelength. Preferably, the value of spacing 1 is selected once dimension L of the pattern has been determined and once the thickness of layer 130 has been determined, this determination being performed based on technological criteria such as its bonding, its deposition lifetime, or the like.

Especially, the filling factor ranges between 95% and 99.5%, and preferably 97.5% and 99.5%.

A constructive interference thus creates at the level of microbridge 106 between the incident radiation on said bridge and the radiation reflected by the reflective assembly. Since, on the other hand, microbridge 106 is suspended at a height $e_{bolometer\_cavity}$ on the order of a few micrometers, which is thus much smaller than the wavelength of the incident radiation, advantageously a height smaller than 3 micrometers, for example, 2 micrometers, microbridge 106 is placed in a region where the electromagnetic field intensity is maximum.

As a numerical example, a silicon oxide layer 130 having a thickness of 11 micrometers, supporting a periodic array of square patterns having a side length ranging between 29.3 micrometers and 29.65 micrometers, and preferably 29.65 micrometers, arranged with a 30-micrometer pitch, allows a maximum absorption by microbridge 106 for a 450-micrometer wavelength (or a 670-GHz frequency).

For the same layer 130, a periodic array of square patterns having a side length ranging between 9.90 micrometers and 9.95 micrometers, and preferably of 9.95 micrometers, arranged with a 10-micrometer pitch allows an optimal absorption by microbridge 106 for a 200-micrometer wavelength (or a 1.5-THz frequency).

In operation, an electromagnetic radiation in the terahertz range is captured by bowtie antenna 118. The electromagnetic power captured by antenna 118 is converted into heat in the portions of conductive layer 116 located substantially between fins 120, 122, 124. Thermometric element 126, which is in contact with conductive layer 116, then undergoes a heating due to said contact and thus sees its resistance modified. Conductive layer 116, which is also used as the electrode for biasing thermometric element 128, is then regularly biased to submit thermometric element 128 for example to a bias voltage and thus conduct a current therethrough to get to know its resistance variation, as known per se.

A method for manufacturing the detector just described will now be disclosed in relation with FIGS. 9 to 11.

As illustrated in FIG. 9, reflective assembly 104, 130, 132 of the detector comprises a reflector 132, arranged on read circuit 134, such as for example an aluminum layer 130 preferably having the lowest possible absorption coefficient in the operating wavelength of the detector. For example, layer 130 is formed of SiO, $SiO_2$, SiN, $Ta_2O_5$, $Ta_2O_5$—$TiO_2$, $HfO_2$, $SrTiO_3$, $Ba_{1-x}Sr_xTiO_3$ or of a mixture thereof. The reflective assembly also comprises array 104.

Array 104 and layer 130 are further selected to obtain a constructive interference at the level of microbridge 106 as previously described, to obtain a resonant cavity for the terahertz radiation to be detected.

Layer 130 is further crossed by electric connections 133, for example, in line with anchoring nails 108. For example, vias are formed in layer 130 according to a usual technique, and the vias thus formed are filled with a metal such as tungsten, aluminum, or copper by means of a damascene technology associated with a planarization technique.

Once support 102 and array 104 have been manufactured, a sacrificial layer 140 (FIG. 10), for example, made of polyimide, having a thickness ranging between 0.5 micrometer and 5 micrometers, preferably between 0.5 μm and 2.5 μm, is formed on array 104 and layer 130. The thickness of the sacrificial layer is preferably selected to be as small as possible while being compatible with the mechanical hold of microbridge 106 (electrostatic bonding) and the thermal insulation requirements of microbridge 106 with respect to support 102.

An insulator layer 114 is then deposited on sacrificial layer 140, after which a thin metal film 116, for example, made of Ti, TiN, Pt, NiCr or the like, is deposited on insulator layer 114.

As previously described, metal film 116 ensures the function of electric power supply and reading of thermometric element 128 via thermal insulation arms 112 and the resistive charge function due to its surface in contact with bowtie antenna 118.

Insulator layer 114 and thin film 116, each having a thickness ranging between 0.005 micrometer and 0.05 micrometer, are preferably deposited by PECVD ("Plasma Enhanced Chemical Vapor Deposition") or cathode sputtering, and then etched, chemically or with a plasma, to form insulation arms 112. Metal film 116 is also etched, chemically or with a plasma, to form a central portion 142, on which will be formed fins 120, 122, 124 and antenna 118, and lateral portions 144, which will be in contact with thermometric element 128 for its power supply and its reading.

The sheet resistance of metal film 116 is advantageously selected to achieve an efficient thermal insulation of microbridge 106 from read circuit 134. Preferably, the sheet resistance of metal film 116 ranges between 100 Ω/square and 500 Ω/square, to obtain a high thermal resistance value for the microbolometers arms. Finally, metal film 116 is connected to read circuit 134 via conductive anchoring nails 108, formed through sacrificial layer 140 similarly to connections 132.

Antenna 118 and fins 120, 122, 124 are formed of a conductive material such as aluminum, tungsten silicide, titanium, or the like. For their forming, a layer of the conductive material, having a thickness ranging between 0.1 micrometer and 0.5 micrometer, is deposited on central portion 142 of metal film 116 by cathode sputtering or by low-pressure chemical vapor deposition (LPCVD) or plasma-enhanced chemical vapor deposition (PECVD), after which the second antenna and the fins are formed by chemical etching, plasma etching, or by a technique of lift-off type applied to said layer. As a variation, the antenna and the fins are formed of metallic multilayers.

Antenna 118 and fins 120, 122, 124 thus formed define regions which convert the terahertz electromagnetic radiation into electric current and define exposed areas of metal film 116 which convert the electric current into thermal power.

Antenna 118 and fins 120, 122, 124 are then covered with a layer 126 of insulating material, such as SiN, SiO, ZnS or the like (FIG. 11). Layer 126, having a thickness ranging between 0.005 micrometer and 0.1 micrometer, is formed to avoid any short-circuit between fins 120, 122, 124, and thermometric element 128. Layer 126 is for example formed by means of a low-temperature deposition technique such as cathode sputtering or plasma-enhanced vapor deposition (PECVD). Layer 126 is then etched, for example, chemically or by plasma, to expose lateral portions 144 of metal film 116 to which will be connected thermometric element 128, as well as thermal insulation arms 112.

Thermometric element 128 is then deposited on layer 126 and lateral portions 144, for example by means of a low-temperature deposition technique such as a sputtering. The material forming thermometric element 128 for example is an amorphous or polycrystalline semiconductor, such as Si, Ge, SiC, a-Si:H, a-SiGe:H, a metallic material, or a vanadium oxide or a magnetite oxide. This material must have a non-zero temperature coefficient resistance (TCR). In other words, its resistance varies according to temperature.

Finally, sacrificial layer 140 is removed, its nature determining the release technique, preferably by chemical or plasma etching.

As can be observed, the etching of the materials forming the detector according to the present invention is mainly or exclusively performed by chemical etch techniques, which may be plasma enhanced, such techniques providing accurate and reproducible etchings.

Figure 12:
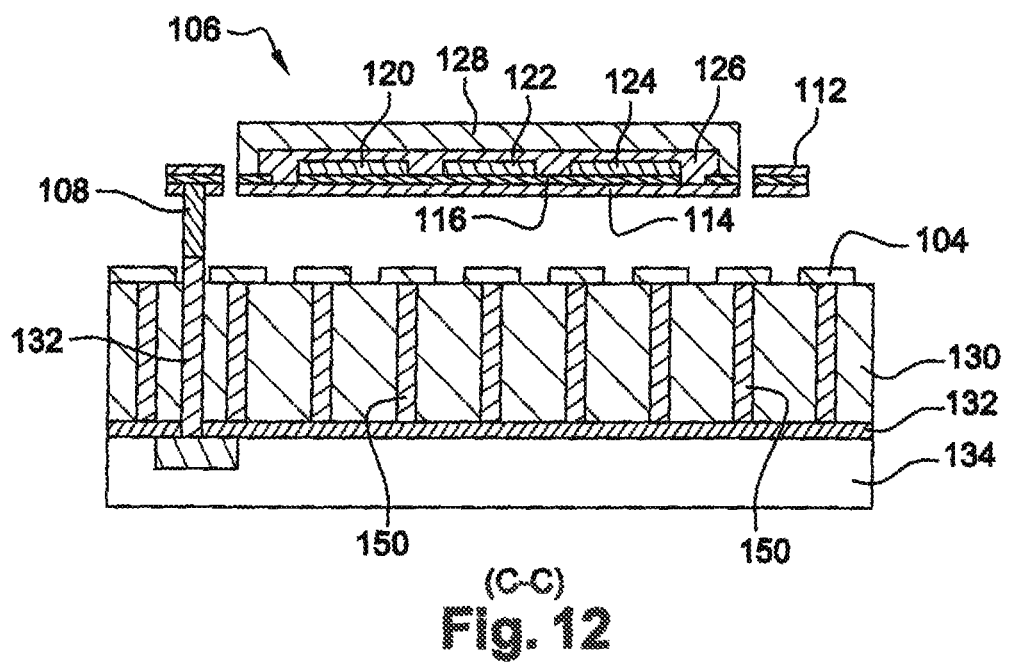
FIG. 12 is a cross-section view along plane C-C of a variation of the detector of FIGS. 7 and 8.

The simplified cross-section view of FIG. 12 illustrates a variation of the embodiment just described, this variation also enabling to form any resonant cavity according to the present invention.

This variation differs from the detector just described by the presence of metallized vias 150, for example substantially identical to vias 133 used for the connections of microbridge 106 to read circuit 134, connecting the patterns of array 104 to reflector 132. This enables to increase the absorption efficiency when the radiation reaches microbridge 106, and thus reflective assembly 104, 130, 132 under an oblique incidence. Indeed, inductive effects add to the capacitive effects since a current then flows between each pattern and the patterns closest thereto.

Further, this variation introduces no additional manufacturing step with respect to the previously-described method, vias 150 being manufactured simultaneously to vias 133.

Bolometric detectors with an antenna have been described, where the antennas are suspended in a microbridge. The present invention also applies to detectors where one or several antennas are formed on the support.

Figure 13:
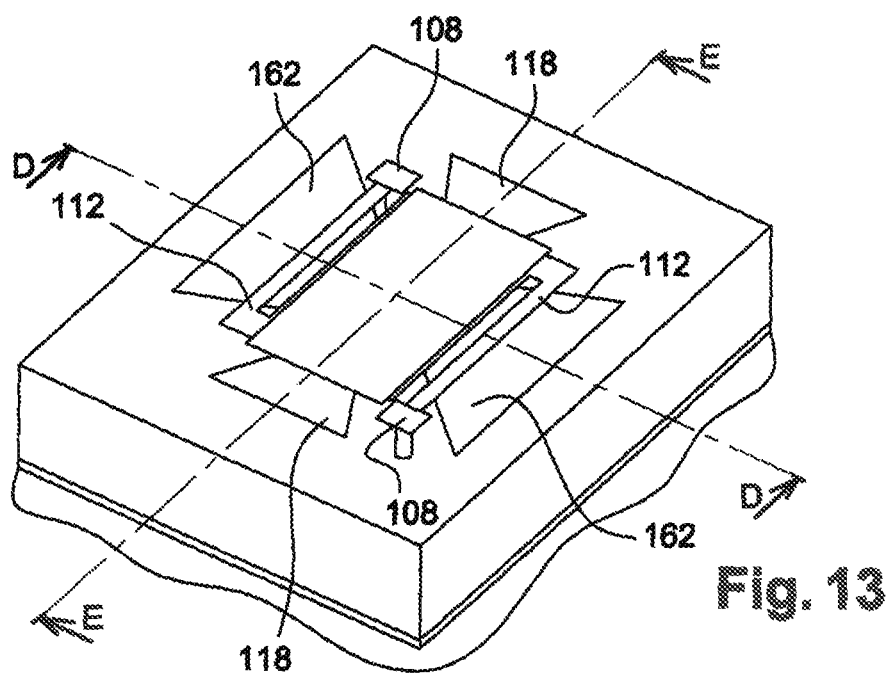
FIG. 13 is a simplified perspective view of a second embodiment of a bolometric detector according to the present invention.
Figure 14:
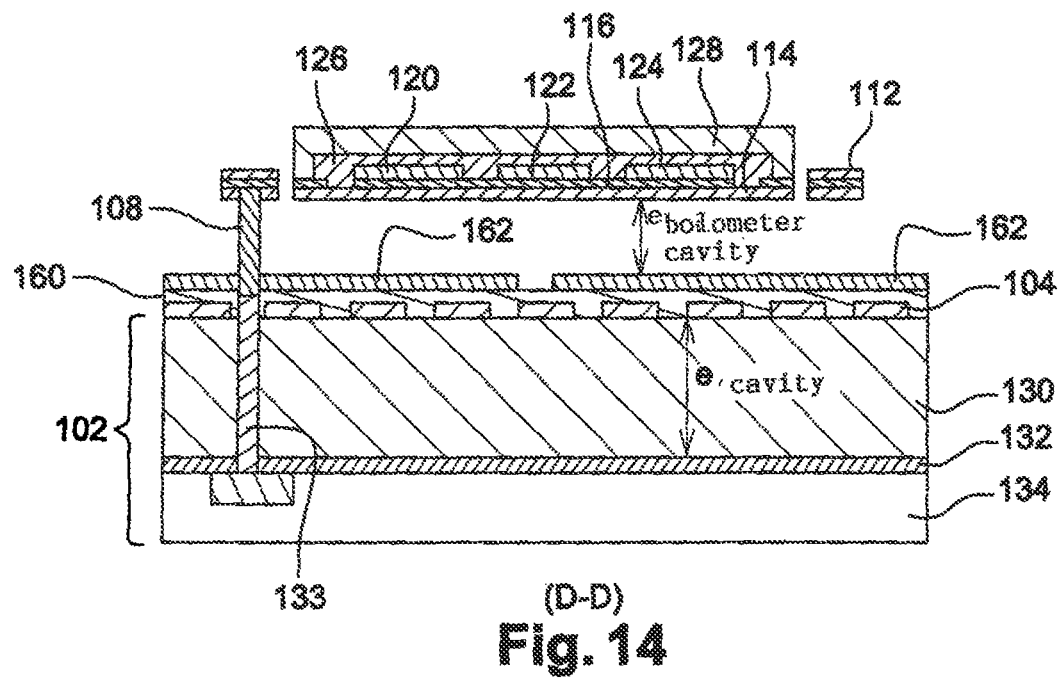
FIGS. 14 and 15 are simplified cross-section views of the detector according to the first embodiment, respectively along planes D-D and E-E of FIG. 13.
Figure 15:
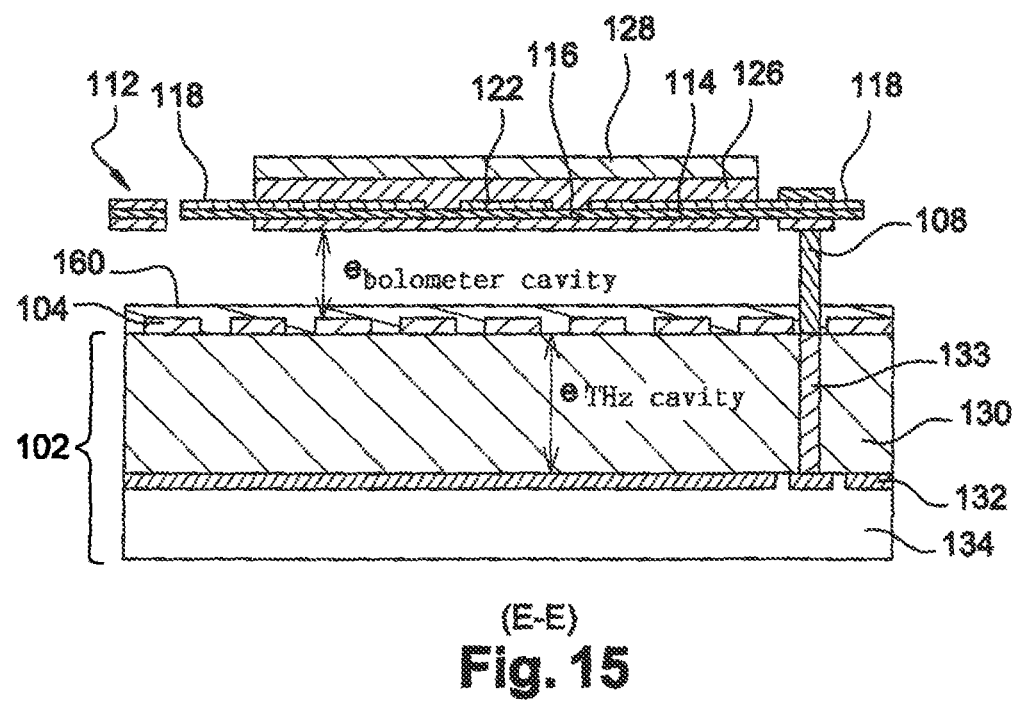

A second embodiment of the present invention comprising such an antenna is described in relation with FIGS. 13 to 15. This embodiment differs from that described in relation with FIGS. 7 and 8 in that it comprises an insulator layer 160 deposited on periodic pattern array 104 and in that a second planar bowtie antenna 162 made of a conductive material, for example, that forming first antenna 118, is formed on insulator layer 160. Second antenna 162 is crossed with first antenna 118 and has a main axis (D-D) perpendicular to main axis (E-E) of the first antenna.

Second antenna 162 is capacitively coupled with fins 120, 122, 124, some of its surfaces to being opposite thereto. Fins 120, 122, 124 are also selected to achieve an impedance matching with second antenna 162. The fins are especially selected to comply with relation:

$$\sqrt{\left(\frac{1}{\pi \cdot f \cdot C}\right)^2 + (R \cdot C)^2} \approx 100 \, \Omega$$

where f is a frequency of the radiation to be detected, C is the value of the capacitance formed between second antenna 162 and fins 120, 122, 124, and R is the value of the resistor in series with fins 120, 122, 124. Preferably, the thickness of the cavity separating microbridge 106 and support 102 is selected to be as small as possible while being compatible with the mechanical hold of the microbridge (electrostatic bonding) and the thermal insulation constraint.

Thus, the electromagnetic power captured by second antenna 162 is transmitted to fins 120, 122, 124 by capacitive coupling. The electromagnetic power transmitted to fins 120, 122, 124 is then converted into heat in the areas of conductive layer 116 located substantially between the fins, on which the fins are formed and thus in electric contact.

Insulator layer 160, for example made of SiN, SiO, ZnS, is deposited on array 104 by means of a low-temperature deposition technique such as for example a cathode sputtering or a PECVD. Second antenna 162, made of a conductive material such as aluminum, tungsten silicide, titanium, or the like is for example formed on insulator layer 160 by a usual photolithography technique and has a thickness ranging between 0.1 micrometer and 0.5 micrometer.

Such a detector with crossed bowtie antennas enables to achieve a decoupling of the bowtie antennas which are not located on the same plane and are not deposited on a same support, an optimal impedance matching being due to the fins, impedance matching being further achieved independently for each of the antennas, and a very small surface area of the resistive load, thus decreasing the coupling of the detector with the infrared radiation which is, as a first approximation, proportional to the load surface area.

Detectors designed for a detection in a terahertz radiation range have been described. More specifically, the characteristics of the detectors, and especially the geometry of the antennas and the characteristics of the reflective assemblies, are determined for a specific wavelength, the detection being then performed in a range centered around this wavelength.

The present invention advantageously provides reflective assemblies of same thickness for different wavelengths, and thus for different wavelengths of the incident radiation.

Figure 16:
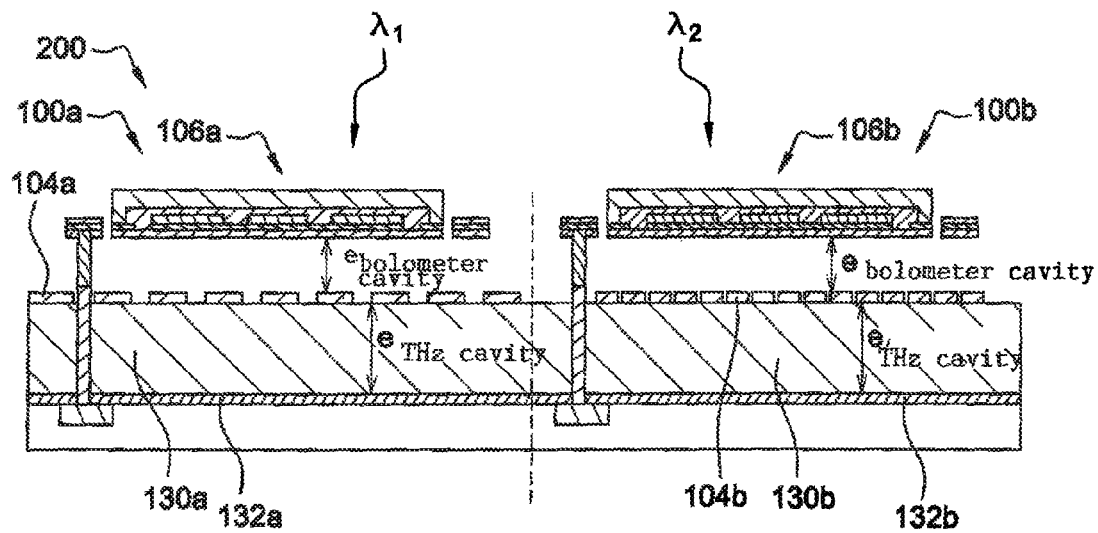
FIG. 16 is a simplified cross-section view of two detectors placed side-by-side according to the present invention, intended to detect two different terahertz ranges.

FIG. 16 is a cross-section view schematically illustrating a bispectral detector 200 comprising two detectors 100a, 100b, for example, two detectors such as described in relation with FIGS. 7 and 8, arranged side by side and sharing a common support of constant thickness. In particular, the thickness of insulator layers 130a, 130b comprised in the reflective assemblies is constant, the respective periodic pattern arrays 104a, 104b of these detectors being designed to obtain the resonance phenomenon in two different wavelength ranges. If desired, a conventional reflective assembly may be provided for the detector associated with the smallest wavelength and a reflective assembly according to the present invention may be provided for the largest wavelength range to obtain a constant thickness of the reflective assembly.

By means of such a multispectral detector 200, it is possible to implement a detection, for example, an imaging function, in two wavelength ranges for which the atmosphere is known to be transparent, usually designated as "atmospheric window", that is, a first range around 670 GHz and a second range around 850 GHz.

It is also possible to implement a detection, for example, an imaging function, in a first range, for example, one of the atmospheric windows, together with the implementation of a spectroscopy function for identifying the nature of a material, the identification being performed in the range from 2 to 3 THz.

Of course, more than two different detectors may be used together.

Similarly, the present invention enables to extend the spectral detection range of a unit detection element, or "pixel", of an array detector.

It is especially known that the resolution of an imager is determined by its modulation transfer function, or "MTF", which characterizes the frequency response of the optical system formed of the optics and of the sensor. For an ideal optical system, having its resolution only limited by diffraction phenomena, the system resolution for detection wavelength λ has value 1.22×λ×N added thereto, where N is the aperture of the optical system. Now, the pixel pitch of an array detector usually being equal to λ/2, the pixel dimensions are not characteristics which limit the system resolution in the terahertz range.

According to an embodiment of the present invention, the subwavelength characteristic of the pixel dimensions may thus advantageously be used to extend the pixel detection range.

Figure 17:
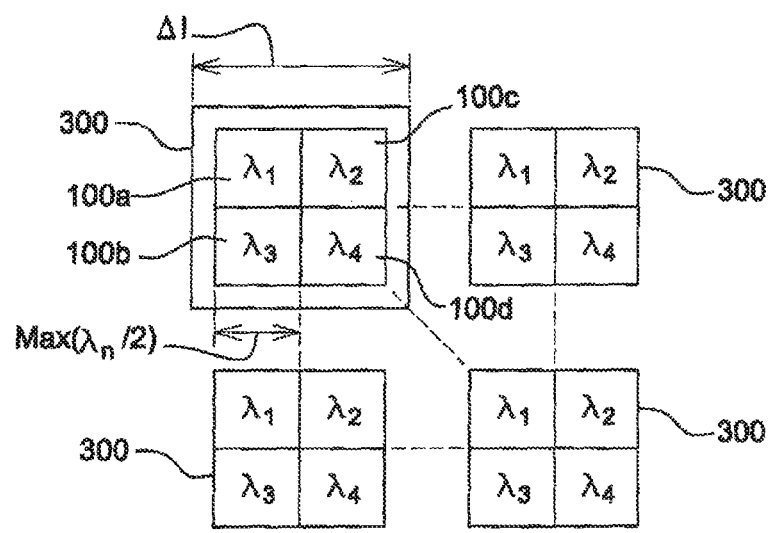
FIG. 17 is a simplified top view of a multispectral array detector according to the invention.

Referring to FIG. 17, for an optical system of resolution Δl, several membranes with their associated reflective assemblies and antennas are inscribed within a square of surface area Δl×Δl to form a detector of a radiation originating from the same point of the scene observed at several wavelengths, for example, four wavelengths $\lambda_1, \lambda_2, \lambda_3, \lambda_4$.

An array of macro pixels 300 formed of detection elements 100a, 100b, 100c, 100d, is thus obtained, the dimensions of said elements being smaller than or equal to the maximum from among $\lambda_1/2, \lambda_2/2, \ldots \lambda_n/2$, and each of these elements having a specific absorption frequency. The number of simultaneous frequencies is only limited by the decrease of the collection surface area, which decreases for a given frequency by a factor 1/n.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A bolometric detector of an electromagnetic radiation in a terahertz wavelength range, comprising:
    a support comprising an assembly reflective for said electromagnetic radiation;
    at least one bolometric microbridge suspended above the reflective assembly by support (108) and thermal insulation pads, the microbridge comprising:
        a first bowtie antenna intended to collect said electromagnetic radiation;
        a resistive load coupled with said antenna to convert the collected electromagnetic power into thermal power; and
        a thermometric element coupled with the resistive load to heat up under the effect of the generated thermal power,
    wherein the reflective assembly comprises:
        a layer reflective for said electromagnetic radiation;
        an insulating material layer formed on the reflective layer;
        and a periodic array of metallic patterns formed on the insulating material layer, the thickness and the dielectric permittivity of the insulating material layer, and the pitch and the filing factor of the array being selected to obtain a constructive interference, at the level of said microbridge, between the incident radiation to be detected and the radiation reflected by said reflective assembly.

2. The bolometric detector of claim 1, wherein the pitch of the array ranges between $$\frac{\lambda}{12} \text{ and } \frac{\lambda}{20},$$

where $\lambda$ is the wavelength of the incident radiation to be detected.

3. The bolometric detector of claim 1, wherein the thickness of the insulating material layer ranges between 8 micrometers and 15 micrometers.

4. The bolometric detector of claim 1, wherein the microbridge is suspended above the support at a height ranging between 0.5 micrometer and 2.5 micrometers.

5. The bolometric detector of claim 1, wherein it comprises metal vias formed in the insulating material layer and connecting the patterns of the array to the reflective layer.

6. The bolometric detector of claim 1, wherein it comprises a second bowtie antenna intended to collect the electromagnetic radiation, said second antenna being crossed with the first bowtie antenna, and formed on a layer of insulating material deposited on the periodic pattern array, and said second antenna being capacitively coupled with the resistive load of the microbridge.

7. The bolometric detector of claim 6, wherein the resistive load capacitively coupled with the second antenna comprises a metal film, and where the microbridge comprises fins arranged in front of the second antenna on the metal film to achieve an impedance matching between the second antenna and the metal film.

8. The bolometric detector of claim 7, wherein the fins are covered with an electric insulator, the thermometric element being at least partially arranged on said insulator and at least partially in contact with the metal film.

9. The bolometric detector of claim 8, wherein the resistive load comprises a metal film, and wherein the first antenna is at least partially arranged on this metal film.

10. The bolometric detector of claim 7, wherein the resistive load comprises a metal film, and wherein the first antenna is at least partially arranged on this metal film.

11. The bolometric detector of claim 6, wherein the resistive load comprises a metal film, and wherein the first antenna is at least partially arranged on this metal film.

12. A detection system comprising at least a first and a second detector, each according to any of the foregoing claims, wherein:
    the first detector is capable of detecting an electromagnetic radiation in a first terahertz range, and the second detector is capable of detecting an electromagnetic radiation in a second terahertz range different from the first terahertz range; and
    the reflective layer of the first detector is aligned with the reflective layer of the second detector, and the insulating material layer of the first detector is aligned with the insulating material layer of the second detector.

* * * * *

UNITED STATES PATENT AND TRADEMARK OFFICE
CERTIFICATE OF CORRECTION

PATENT NO. : 8,895,930 B2  
APPLICATION NO. : 13/687583  
DATED : November 25, 2014  
INVENTOR(S) : Jean-Louis Ouvrier-Buffet et al.

Page 1 of 1

It is certified that error appears in the above-identified patent and that said Letters Patent is hereby corrected as shown below:

In the Claims

Col. 16, Claim 9, Line 28, delete "claim 8" and replace with --claim 6--;

Col. 16, Claim 11, Line 34, delete "claim 6" and replace with --claim 8--.

Signed and Sealed this  
Third Day of March, 2015

Michelle K. Lee  
*Deputy Director of the United States Patent and Trademark Office*